(12) United States Patent
He et al.

(10) Patent No.: US 11,561,659 B2
(45) Date of Patent: Jan. 24, 2023

(54) TOUCH STRUCTURE AND TOUCH DISPLAY PANEL

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Fan He, Beijing (CN); Kemeng Tong, Beijing (CN); Cong Fan, Beijing (CN); Xiangdan Dong, Beijing (CN); Shun Zhang, Beijing (CN); Ping Wen, Beijing (CN); Yi Zhang, Beijing (CN); Yu Wang, Beijing (CN); Siyu Wang, Beijing (CN); Tingliang Liu, Beijing (CN); Chang Luo, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/280,543

(22) PCT Filed: Jun. 30, 2020

(86) PCT No.: PCT/CN2020/099256
§ 371 (c)(1),
(2) Date: Mar. 26, 2021

(87) PCT Pub. No.: WO2022/000263
PCT Pub. Date: Jan. 6, 2022

(65) Prior Publication Data
US 2022/0197439 A1    Jun. 23, 2022

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04112* (2013.01)

(58) Field of Classification Search
CPC . G06F 2203/04101; G06F 2203/04111; G06F 2203/04112; G06F 3/0443; G06F 3/0446
See application file for complete search history.

(56) References Cited

U.S. PATENT DOCUMENTS 10,235,002 B2   3/2019   Church et al.
10,454,048 B2   10/2019  Jeong
(Continued)

FOREIGN PATENT DOCUMENTS

CN    104111759 A    10/2014
CN    107797697 A    3/2018
(Continued)

*Primary Examiner* — Robin J Mishler
(74) *Attorney, Agent, or Firm* — Dilworth & Barrese, LLP.; Michael J. Musella, Esq.

(57) ABSTRACT

A touch structure and a touch display panel are provided. The touch structure includes a first touch; the first touch electrode includes a plurality of first touch electrode portions connected in series, each of the first touch electrode portions includes a first main body portion and a plurality of first finger portions, and the plurality of first finger portions protrude from the first main body portion; at least one first finger portion of at least one of the plurality of first touch electrode portions includes a first finger effective electrode and a first finger dummy electrode, the first finger dummy electrode is insulated from the first finger effective electrode, and the first finger effective electrode is connected with the first main body portion.

14 Claims, 8 Drawing Sheets

(56) References Cited

U.S. PATENT DOCUMENTS

| | | | |
|---|---|---|---|
| 10,642,438 B1 | 5/2020 | Deng et al. | |
| 2014/0098304 A1* | 4/2014 | Kim ..................... | G06F 3/0443 |
| | | | 349/12 |
| 2017/0160870 A1 | 6/2017 | Lee et al. | |
| 2019/0332204 A1 | 10/2019 | Lee | |
| 2020/0012386 A1 | 1/2020 | Zhang et al. | |
| 2021/0117044 A1 | 4/2021 | Nakayama et al. | |
| 2021/0173524 A1* | 6/2021 | Deng .................... | G06F 3/0443 |

FOREIGN PATENT DOCUMENTS

| | | |
|---|---|---|
| CN | 108415629 A | 8/2018 |
| CN | 108536329 A | 9/2018 |
| CN | 108874228 A | 11/2018 |
| CN | 109656407 A | 4/2019 |
| CN | 109871157 A | 6/2019 |
| CN | 110178106 A | 8/2019 |
| CN | 110727373 A | 1/2020 |
| CN | 111258462 A | 6/2020 |
| KR | 1020190108870 A | 9/2019 |
| WO | 2019090585 A1 | 5/2019 |

\* cited by examiner

TOUCH STRUCTURE AND TOUCH DISPLAY PANEL

TECHNICAL FIELD

At least one embodiment of the present disclosure relates to a touch structure, and a touch display panel.

BACKGROUND

In recent years, in order to achieve the purpose of portability and easy operation, many electronic products have replaced the traditional keyboard or mouse with a touch panel as an input device. Among the electronic products with touch panel as the input device, touch display devices with both a touch function and a display function are one of the most attractive products. A touch electrode structure used to realize the touch function is an important factor affecting user's experience.

SUMMARY

At least one embodiment of the present disclosure provides a touch structure comprising a first touch electrode and a second touch electrode; the first touch electrode extends along a first direction, the second touch electrode extends along a second direction, and the first direction intersects with the second direction; the first touch electrode comprises a plurality of first touch electrode portions connected in series, each of the first touch electrode portions comprises a first main body portion and a plurality of first finger portions, and the plurality of first finger portions protrude from the first main body portion; at least one of the plurality of first touch electrode portions comprises a dummy electrode, and at least a part of the dummy electrode is in at least one first finger portion of the at least one of the plurality of first touch electrode portions; the at least one first finger portion of the at least one of the plurality of first touch electrode portions comprises a first finger effective electrode, the dummy electrode is insulated from the first finger effective electrode, and the first finger effective electrode is connected with the first main body portion of the at least one first touch electrode portion.

For example, the at least a part of the dummy electrode in the at least one first finger portion is a first finger dummy electrode, and the first finger dummy electrode is inside the first finger effective electrode.

For example, each of the plurality of first touch electrode portions and each of the plurality of second touch electrode portions respectively comprise a plurality of metal meshes constituted by a plurality of metal wires that are connected with each other.

For example, a portion of the first finger effective electrode on any side of the first finger dummy electrode comprises at least two first signal channels, each of the at least two first signal channels is constituted by a plurality of metal wires that are connected in sequence.

For example, an outer contour of the first finger dummy electrode is an irregular polygon, a portion of the first finger effective electrode, between each edge of the first finger dummy electrode and an edge of the first finger portion where the first finger dummy electrode is located, comprises at least two first signal channels.

For example, the second touch electrode comprises a plurality of second touch electrode portions connected in series, each of the plurality of second touch electrode portions comprises a second main body portion and a plurality of second finger portions, and the plurality of second finger portions protrude from the second main body portion.

For example, at least one second finger portion of at least one of the plurality of second touch electrode portions comprises a second finger effective electrode and a second finger dummy electrode, the second finger dummy electrode is insulated from the effective electrode, and the second finger effective electrode is connected with the second main body portion.

For example, the first finger portions are in a same layer as the second finger portions, and insulated from and interdigitated with the second finger portions.

For example, the dummy electrode further comprises a first main dummy electrode in the first main body portion of the at least one of the plurality first touch electrode portions, the first main body portion of the at least one of the plurality first touch electrode portions comprises a first main effective electrode, and the first main dummy electrode is insulated from the first main effective electrode; in each of the plurality first touch electrode portions, the first main effective electrode is electrically connected with the first finger effective electrode.

For example, the first main effective electrode comprises at least one strip-shaped electrode, and the first main dummy electrode comprises a plurality of dummy sub-electrodes, and the at least one strip-shaped electrode separates the plurality of dummy sub-electrodes from each other.

For example, each of the at least one strip-shaped electrode comprises at least two second signal channels, and each of the at least two second signal channels is constituted by a plurality of metal wires that are connected in sequence.

For example, one of the plurality of dummy sub-electrodes is connected with the first finger dummy electrode.

For example, the first main dummy electrode comprises a dummy main body portion and a plurality of dummy finger portions, the plurality of dummy finger portions protrude from the dummy main body portion, the plurality of dummy finger portions are in a same layer as the first main effective electrode, and are interdigitated with and insulated from the first main effective electrode.

For example, the dummy main body portion is in a shape of rectangle, and the plurality of dummy finger portions protrude from four sides of the rectangle.

For example, the first main dummy electrode further comprises four complementary portions, the four complementary portions are at positions respectively corresponding to four vertices of the dummy main body portion, so that an outer contour of the first main dummy electrode is rectangular.

For example, the second main body portion of at least one of the plurality of second touch electrode portions comprises a second main effective electrode and a second main dummy electrode, the second main dummy electrode is inside the second main effective electrode and is insulated from the second main effective electrode.

For example, the first touch electrode and the second touch electrode constitute a touch unit at an intersection of the first touch electrode and the second touch electrode, the touch unit comprises halves, facing to each other, of two first touch electrode portions that are connected at the intersection, halves, facing to each other, of two second touch electrode portions that are connected at the intersection, a first connection portion connecting the two first touch electrode portions and a second connection portion connecting the two second touch electrode portions, and an effective area of the touch unit accounts for 36%-48% of a total area of the touch unit.

At least one embodiment of the present disclosure provides a touch structure comprising a first touch electrode and a second touch electrode; the first touch electrode extends along a first direction, the second touch electrode extends along a second direction, and the first direction intersects with the second direction; the first touch electrode comprises a plurality of first touch electrode portions, each of the first touch electrode portions comprises a first main body portion and a plurality of first finger portions, and the plurality of first finger portions protrude from the first main body portion; the first main body portion comprises a first main effective electrode and a first main dummy electrode which are insulated from each other; the first main dummy electrode of at least one of the plurality of first touch electrode portions comprises a dummy main body portion and a plurality of dummy finger portions, the dummy main body portion is a rectangle and the plurality of dummy finger portions protrude from four sides of the rectangle; the first main dummy electrode further comprises four complementary portions that are at positons respectively corresponding to four vertices of the dummy main body portion, so that an outer contour of the first main dummy electrode is in a shape of rectangle.

For example, each of the complementary portions and the dummy finger portion adjacent to the each of the complementary portions are provided side by side along a third direction, and maximum sizes of the complementary portions along a fourth direction are same, and the third direction is different from the fourth direction.

For example, each of the four complementary portions is spaced apart from or connected with the dummy main body portion.

At least one embodiment of the present disclosure provides a touch display panel comprising: a base substrate, a display structure, and the touch structure as described above, the display structure and the touch structure are sequentially stacked on the base substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
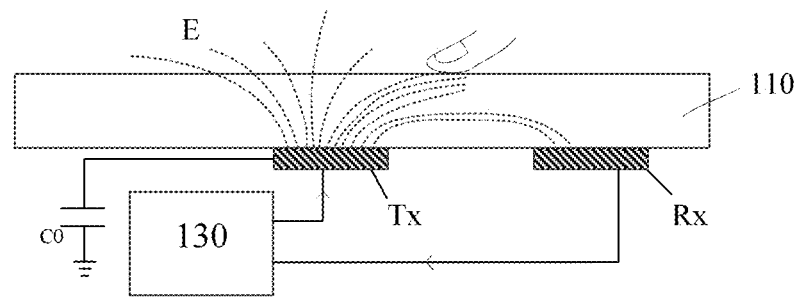
FIG. 1 is a schematic diagram of the working principle of a touch structure.

The following will clearly and completely describe the technical solutions in the embodiments of the disclosure with reference to the non-limiting exemplary embodiments shown in the drawings, and more fully explain the exemplary embodiments of the disclosure and their various features and advantageous details. It should be noted that the features shown in the drawings are not necessarily drawn to scale. The disclosure omits descriptions of known materials, components, and process techniques so as not to obscure the exemplary embodiments of the disclosure. The exemplary embodiments given are only intended to facilitate understanding of the implementation of the disclosure and further enable those skilled in the art to implement the disclosure. Therefore, these exemplary embodiments should not be understood as limiting the scope of the present disclosure.

Unless otherwise specifically defined, technical terms or scientific terms used in the disclosure shall have the ordinary meaning understood by those in the art. As used in the disclosure, "first", "second" and similar words do not indicate any order, quantity or importance, but are only used to distinguish different components. Furthermore, in various embodiments of the present disclosure, the same or similar reference numerals refer to the same or similar components.

Organic light emitting diode (OLED) display panel has characteristics of self-illumination, high contrast, low energy consumption, wide viewing angle, fast response speed, flexible panel, wide temperature range and simple manufacturing process, and has a broad development prospect. In order to meet diverse needs of users, it is of great significance to integrate various functions in the display panel, such as a touch function and a fingerprint recognition function. For example, forming an on-cell touch structure in the OLED display panel is an implementation way, which realizes the touch function of the display panel by forming the touch structure on the encapsulation film of the OLED display panel.

For example, a mutual capacitance touch structure includes a plurality of touch electrodes, the plurality of touch electrodes include a touch drive electrode and a touch sense electrode, the touch drive electrode extends in a direction different from the touch sense electrode, and the touch drive electrode Tx and the touch sense electrode Rx form a mutual capacitance for touch sensing at their intersections. The touch drive electrode Tx is configured to input an excitation signal (touch drive signal), and the touch sense electrode Rx is configured to output a touch sense signal. By inputting the excitation signal to touch drive electrode which for example longitudinally extends and receiving the touch sense signal from touch sense electrode which for example transversely extends, a detection signal reflecting the capacitance value at a coupler point (for example, an intersection point) of the transverse electrode and the longitudinal electrode can be obtained. When a finger touches a touch screen (e.g., a cover glass), the coupling between the touch drive electrode and the touch sense electrode at the touch point is affected, thus changing the capacitance value of the mutual capacitance between the touch drive electrode and the touch sense electrode at the intersection point, resulting in the change of the touch sense signal. According to a variation data of a two-dimensional capacitance of the touch screen based on the touch sense signal, a coordinate of the touch point can be calculated.

FIG. 1 illustrates a schematic diagram of a mutual capacitance touch structure. As illustrated in FIG. 1, driven by a touch drive circuit 130, the touch drive signal is applied to the touch drive electrode Tx, thereby generating electric field lines E; the electric field lines E are received by the touch sense electrode Rx to form a reference capacitance. When the finger touches the touch screen 110, because the human body is a conductor, a part of the electric field lines E generated by the touch drive electrode Tx are guided to the finger to form a finger capacitance, which reduces the electric field lines E received by the touch sense electrode Rx, therefore the capacitance value between the touch drive electrode Tx and the touch sense electrode Rx decreases. The touch drive circuit 130 obtains the capacitance value through the touch sense electrode Rx, and compares the capacitance value with a reference capacitance to obtain the variation of the capacitance value. According to the variation data of the capacitance value and the position coordinate of each touch capacitance, the coordinates of the touch point can be calculated.

In the Low Ground Mass (LGM), a capacitance C0 between the touch structure and the ground is small, which makes it more difficult for the charges to be transferred from the touch structure to the ground, resulting in a small amount of signal collected by the touch drive circuit, weak touch performance and even unable to realize the touch function. It is found that the touch performance is related to the mutual capacitance between the finger and the touch electrode in the Low Ground Mass. The larger the mutual capacitance between the finger and the touch electrode is, the weaker the touch performance is. For example, when touching with a big finger or multi-fingers, the mutual capacitance between fingers and touch electrodes increases significantly, which seriously affects the touch sense amount, resulting in false alarm points and false touches. In the case that the touch structure is applied to a flexible product, because a cover film between the touch structure and the finger is thin, the capacitance between the finger and the touch electrode is further increased and the touch performance of the product is reduced.

One solution is to provide a dummy electrode in the touch electrode to reduce an effective area of the touch electrode and thus the capacitance between the finger and the touch electrode is reduced. However, if the area of the dummy electrode is too large, the resistance of the touch electrode is increased and the touch sensitivity is decreased.

At least one embodiment of the present disclosure provides a touch structure, and the touch structure comprises a first touch electrode and a second touch electrode, the first touch electrode extends along a first direction, the second touch electrode extends along a second direction, and the first direction intersects with the second direction; the first touch electrode comprises a plurality of first touch electrode portions connected in series, each of the first touch electrode portions comprises a first main body portion and a plurality of first finger portions, and the plurality of first finger portions protrude from the first main body portion; at least one of the plurality of first touch electrode portions comprises a dummy electrode, and at least a part of the dummy electrode is in at least one first finger portion of the at least one of the plurality of first touch electrode portions; the at least one first finger portion comprises a first finger effective electrode, the dummy electrode is insulated from the first finger effective electrode, and the first finger effective electrode is connected with the first main body portion.

In the touch structure provided by the embodiments of the disclosure, the effective area of the touch electrode is reduced by arranging the dummy electrode in the finger portion of the touch electrode, and at the same time, resistance increase caused by an excessive large dummy electrode area in the main body portion of the touch electrode is avoided, thereby improving the touch performance of the touch structure in the Low Ground Mass.

Figure 2:
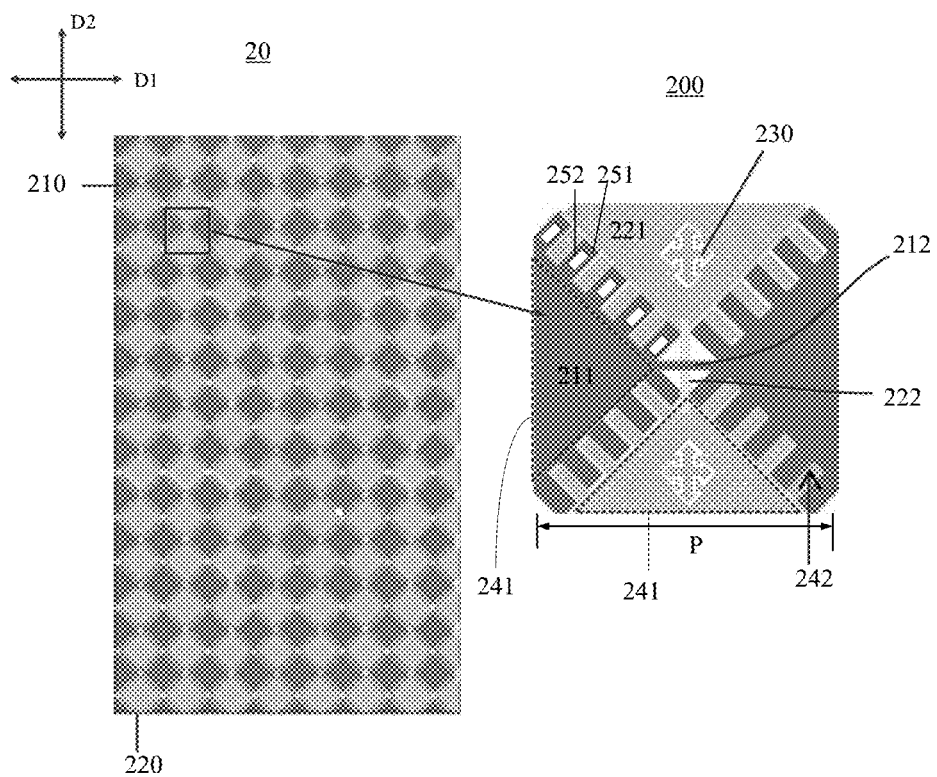
FIG. 2 is a schematic diagram of a touch structure provided by at least one embodiment of the present disclosure.

FIG. 2 is a touch structure 20 provided by the embodiments of the present disclosure, as illustrated in FIG. 2, the touch structure includes a plurality of first touch electrodes 210 extending along a first direction D1 and a plurality of second touch electrodes 220 extending along a second direction D2. The first direction D1 is different from the second direction D2, for example, the first direction D1 and the second direction D2 are orthogonal. For example, the first touch electrode 210 is a touch sense electrode and the second touch electrode 220 is a touch drive electrode. However, the embodiments of the present disclosure impose no limitation to this. For example, in other examples, the first touch electrode 210 is the touch drive electrode and the second touch electrode 220 is the touch sense electrode.

Each first touch electrode 210 includes first touch electrode portions 211 connected in series along the first direction D1, and each second touch electrode 220 includes second touch electrode portions 221 connected in series along the second direction D2. As illustrated in FIG. 2, an outer contour of each first touch electrode portion 211 is diamond-shaped and an outer contour of each second touch electrode portion 221 is diamond-shaped. In other examples, the outer contour of the first touch electrode portion 211 and the outer contour of the second touch electrode portion 221 may be in other shapes, such as triangles, strips and the like.

The touch structure 20 further includes a first connection portion 212 and a second connection portion 222, adjacent first touch electrode portions 211 in the first direction D1 are connected with each other through the first connection portion 212 to form the first touch electrode 210, and adjacent second touch electrode portions 221 in the second direction D2 are electrically connected with each other through the second connection portion 222 to form the second touch electrode 220.

The first touch electrodes 210 and the second touch electrodes 220 are insulated from and crossed with each other to form a plurality of touch units 200 at the intersections, and each touch unit 200 includes at least a part of each of two first touch electrode portions 211 connected at the intersection and at least a part of each of two second touch electrode portions 221 connected at the intersection. FIG. 2 illustrates an enlarged schematic diagram of the touch unit 200 at the right side of the FIG. 2. As illustrated in the figure, each touch unit 20 includes a half of each of the two first touch electrode portions 211 adjacent to each other and a half of each of the two second touch electrode portions 221 adjacent to each other, that is, each touch unit 20 as a whole including an area of one first touch electrode portion 211 and an area of one second touch electrode portion 221. The intersection of the first touch electrode portion 211 and the second touch electrode portion 221 in each touch unit 200 (that is, the intersection of the first connection portion and the second connection portion) form a reference point for calculating the coordinates of the touch point. When a finger touches the capacitive screen, the coupling between the first touch electrode and the second touch electrode near the touch point is affected, thus changing the mutual capacitance between the first touch electrode and the second touch electrode. According to the variation data of the capacitance of the touch screen, the coordinates of each touch point are calculated based on the reference point. For example, the area of each touch unit 200 is substantially equal to the area where a user's finger contacts the touch screen, in order to avoid the case that an excessive large touch unit area causes a touch blind spot, and an excessive small touch unit area causes a false touch signal.

An average side length of each touch unit 200 is P, which is called as the pitch of the touch structure 20. For example, the pitch P ranges from 3.7 mm-5 mm to 5 mm, for example, 4 mm; this is because the diameter of the area where the user's finger is in contact with the touch panel is about 4 mm. For example, the pitch is the same as the average side length of each first touch electrode portion 211 or each second touch electrode portion 221, or is the same as a distance between the centers of two adjacent first touch electrode portions 211 or a distance between the centers of two adjacent second touch electrode portions 221.

As illustrated in FIG. 2, the first touch electrode portion 211 and the second touch electrode portion 221 respectively include a main body portion 241 (an example of the first main body portion or the second main body portion in this disclosure) and a plurality of finger portions 242 (an example of the first finger portions or the second finger portions in this disclosure) protruding from the main body portion 241. The finger portions 242 of the first touch electrode portion 211 are insulated from and interdigitated with the finger portions 242 of the second touch electrode portion 221 adjacent to the first touch electrode portion 211, and are in the same layer as the finger portions 242 of the second touch electrode portion 221 adjacent to the first touch electrode portion 211.

The finger portion increases the perimeter of the touch electrode portion without increasing the region occupied by the touch electrode portion, so that the mutual capacitance is effectively improved without increasing the self capacitance (capacitance load) of the touch electrode portion, thereby improving the touch sensitivity. For example, the shape of the main body portion 241 may be circular or polygonal (e.g., rectangular or diamond), and the shape of the finger portion includes at least one of the following shapes: parallelogram (e.g., rectangular), triangle, trapezoid, hexagon and semicircle; in this case, the shape of the outer contour of the touch electrode portion may be zigzag, wavy, etc. For example, each finger portion 242 is in a shape of "⊓" which is a combination of two rectangles, in order to further increase the side length of the first touch electrode portion 211.

For example, the plurality of finger portions 242 are distributed around the main body portion 241 of the touch electrode portion. For example, the main body portion 241 is in a shape of rectangle, and the number of the finger portions 242 corresponding to each side of the rectangle is 3-10, such as 6-10. In other examples, the main body is in a shape of circle (round), and a plurality of finger portions 242 are evenly distributed on the circumference of the circle.

For example, the length of each finger portion 242 ranges from $1/10$ to $1/3$ of the distance between the centers of two adjacent first touch electrode portions 211, that is, a distance between the center points of the two adjacent first touch electrode portions 211. For example, the distance between the centers is the pitch P of the touch structure. For an irregular finger portion, for example, the length may be an average length, or a maximum length or a minimum length of the finger portion 440.

For example, the width of each finger portion 242 ranges from $1/10$ to $1/4$ of the distance between centers of the two adjacent first touch electrode portion 211, for example, ranges from $1/10$ to $1/4$ of the pitch P of the touch structure. For an irregular finger portion, for example, the width may be the average width, the maximum width or the minimum width of the finger portion 440.

For example, a distance between two adjacent finger portions 242 ranges from $1/20$ to $1/10$ of the pitch P of the touch structure. In the case that the finger portions are not evenly arranged, for example, the distance d may be an average distance, a maximum distance or a minimum distance of two adjacent finger portions 242.

As illustrated in FIG. 2, at least one finger portion 242 of the first touch electrode portion 211 includes a first finger effective electrode 251 and a first finger dummy electrode 252, the first finger dummy electrode 252 is insulated from the first finger effective electrode 251, and the first finger effective electrode 251 is connected to the main body portion 241 of the first touch electrode portion 211. The first finger effective electrode 251 is a part of the first touch electrode portion 211 that achieves effective electrical connection and plays an effective detection role. For example, the first finger dummy electrode 252 is located inside the first finger effective electrode 251. For example, the first finger dummy electrode 252 is completely surrounded by the first finger effective electrode 251; or, the first finger dummy electrode 252 is partially surrounded by the first finger effective electrode 251. For example, at least one side of the first finger dummy electrode 252 is not directly adjacent to the first finger effective electrode 251; for example, the at least one side of the first finger dummy electrode 252 is adjacent to the main body portion 241 of the first touch electrode portion 211. For example, the first finger dummy electrode 252 is connected with the dummy electrode located in the main body 241 of the first touch electrode 211; and the embodiments of the present disclosure are not limited to this. For example, the first finger dummy electrode 252 and the first finger effective electrode 251 are arranged in a same layer and insulated from each other, which can be regarded as that there is a hollow region in the first finger effective electrode 251, and the first finger dummy electrode 252 is located in the hollow region and spaced apart from the first finger effective electrode 251.

For example, the first finger dummy electrode 252 and the first finger effective electrode 251 respectively include a plurality of metal meshes, and are insulated from each other by a fracture of the metal mesh.

It should be noted that "in a same layer" in this disclosure refers to that two or more structures are formed by a same film through a same patterning process or different patterning processes, so that the materials of the structures in the same layer are the same.

For example, the first finger dummy electrode 252 is spaced apart from the main body 241.

For example, the first finger dummy electrode 252 is in a floating state, that is, it is not electrically connected with other structures or does not receive any electrical signals.

For example, an outer contour of the first finger dummy electrode 252 is regular (e.g., rectangular, diamond, etc.) or irregular.

For example, the outer contour refers to a shape obtained by connecting the ends of the first finger dummy electrode 252 with straight lines.

Figure 3A:
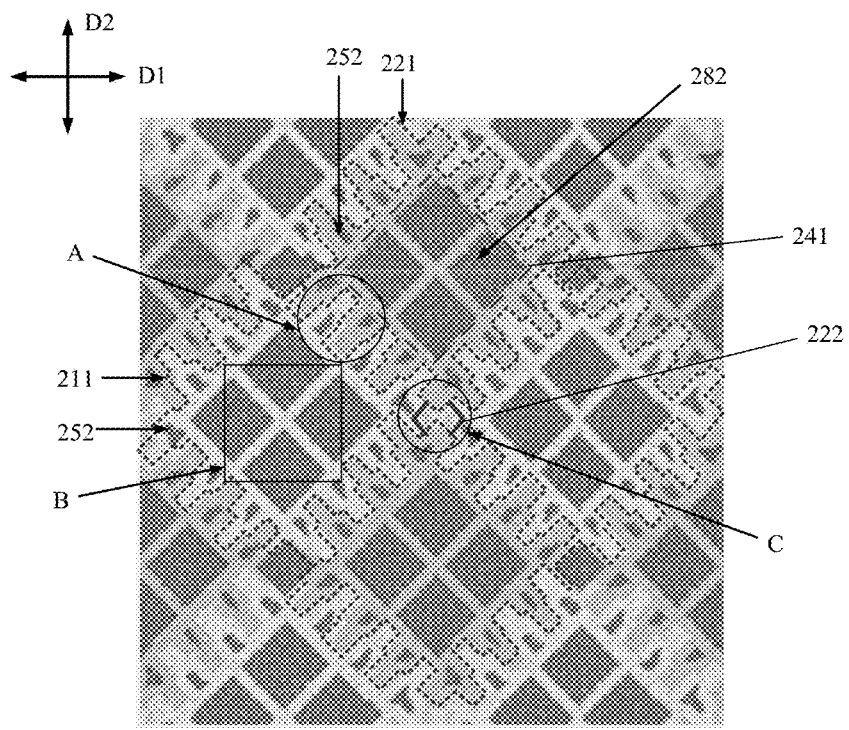
FIG. 3A is another schematic diagram of the touch structure provided by at least one embodiment of the present disclosure.

FIG. 3A illustrates another schematic diagram of the touch structure provided by the embodiments of the present disclosure, and FIG. 3A schematically illustrates two first touch electrode portions 211 adjacent to each other in the first direction D1 and two second touch electrode portions 221 adjacent to each other in the second direction D2, the two second touch electrode portions 221 adjacent to each other in the second direction D2 are electrically connected with each other by the second connection portion 222. FIG. 3A schematically illustrates the boundary between adjacent touch electrode portions with dashed lines.

Figure 3B:
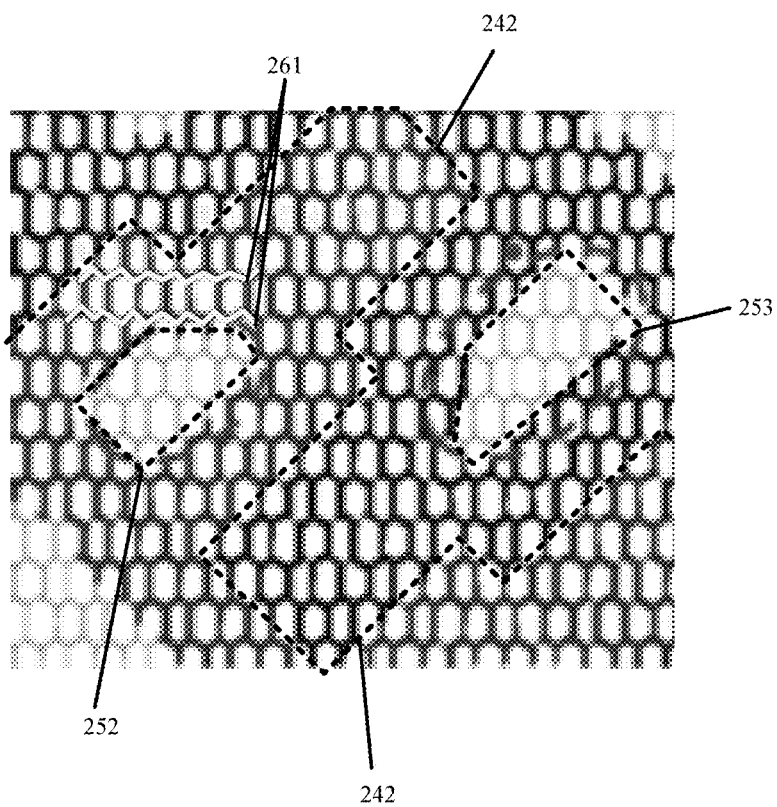
FIG. 3B is an enlarged schematic diagram of the area A in FIG. 3A.

FIG. 3B illustrates an enlarged schematic diagram of the area A in FIG. 3A, and the area A corresponds to the boundary between the first touch electrode portion 211 and the second touch electrode portion 221 adjacent to each other. FIG. 3B illustrates the boundary between the first touch electrode portion 211 and the second touch electrode portion 221 with dashed lines, and illustrates the finger dummy electrode in the finger portion 242 with dashed block.

For example, as illustrated in FIG. 3B, the first touch electrode portion 211 and the second touch electrode portion 221 respectively include a plurality of metal meshes constituted by a plurality of metal wires connected with each other. For example, the shape of each metal mesh is polygonal, such as quadrangle (e.g., rectangle or diamond), pentagon, hexagon, etc.

As illustrated in FIG. 3B, a part of the first finger effective electrode 251 on any side of the first finger dummy electrode 252 includes at least two signal channels 261 (an example of the first signal channel in this disclosure), each signal channel 261 is constituted by a plurality of metal wires that are connected in sequence, and there is no overlap among the at least two signal channels 261 (that is, the at least two signal channels 261 has no shared metal wire).

For example, as illustrated in FIG. 3B, an outer contour of the first finger dummy electrode 252 is an irregular polygon, thus ensuring that a portion of the first finger effective electrode 251, between any side of the first finger dummy electrode 252 and the edge of the finger portion 242 where the first finger dummy electrode 252 is located, includes two signal channels 261.

This arrangement ensures that the touch signal is effectively transmitted by the first finger effective electrode 251, thus avoiding that the touch sensitivity is reduced because of the dummy electrode.

For example, the finger portion 242 of the second touch electrode portion 221 is similarly provided, and FIG. 3B illustrates the second finger dummy electrode 253 located in the finger portion 242 of the second touch electrode portion 221. Detailed description thereof may refer to the description about the first finger dummy electrode 252, which is not repeated here.

For example, a dummy electrode is further arranged in the main body of the touch electrode portion to further reduce the effective area of the touch electrode, thereby reducing the capacitance between the finger and the touch electrode and improving the touch performance.

As illustrated in FIG. 3A, the main body portion 251 of the first touch electrode portion 211 includes a first main effective electrode 281 and a first main dummy electrode 282, and the first main effective electrode 281 is insulated from the first main dummy electrode 282; the first main effective electrode 281 and the first finger effective electrode 251 of the first touch electrode portion 211 are electrically connected to each other to communicate with each other, so as to form the signal channel. For example, the first main dummy electrode 282 is located inside the first main effective electrode 281.

For example, the first main dummy electrode 282 is in a floating state, that is, the first main dummy electrode 282 is not electrically connected with other structures or does not receive any electrical signals.

For example, the first main effective electrode 281 includes at least one strip-shaped electrode, the strip-shaped electrode is electrically connected with the first finger effective electrode 251 of the finger portion 242 to form an effective electrode of the first touch electrode portion 211. The first main dummy electrode 282 includes a plurality of dummy sub-electrodes, and the strip-shaped electrode separates the plurality of dummy sub-electrodes from each other.

The plurality of dummy sub-electrodes are separated from each other by arranging the strip-shaped electrode in the main body portion of the touch electrode portion, so that touch blind spots caused by continuous arrangement of the dummy electrodes can be avoided, and meanwhile, the cross structure forms an effective signal channel between the dummy electrodes, thereby reducing the resistance of the touch electrode.

Figure 3C:
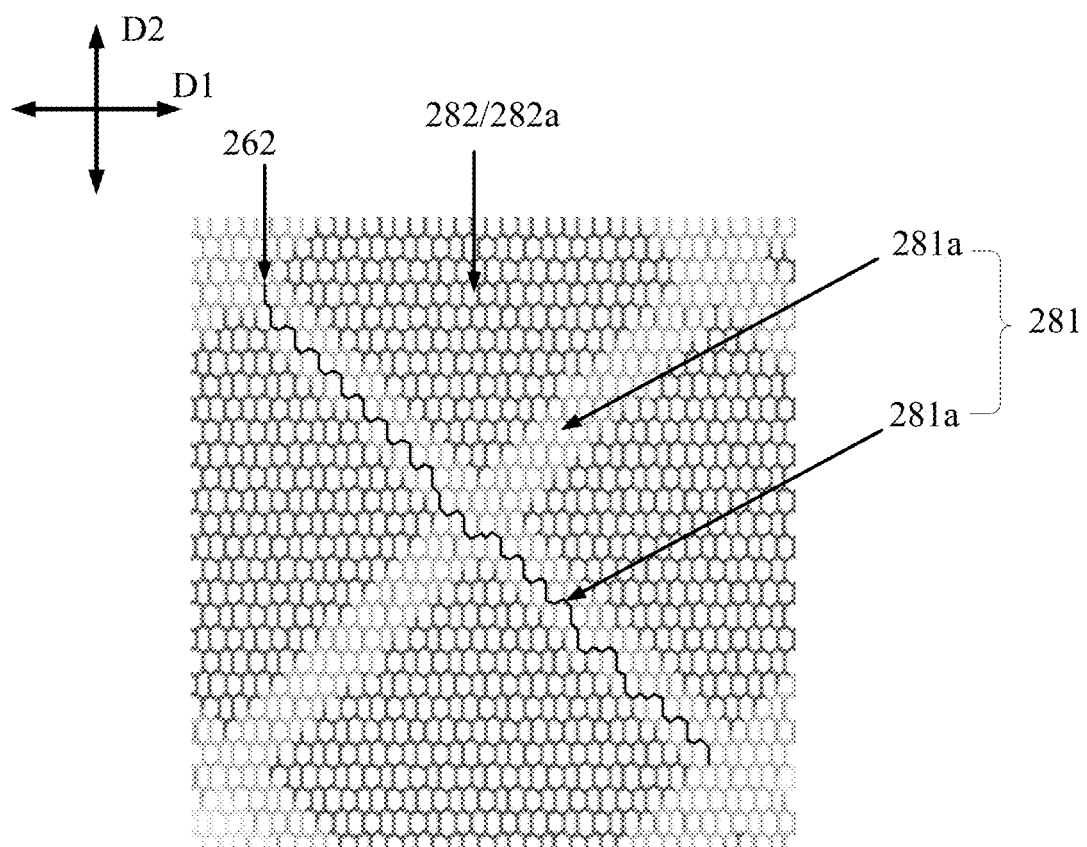
FIG. 3C is an enlarged schematic diagram of the area B in FIG. 3A.

FIG. 3C illustrates an enlarged schematic view of the area B in FIG. 3A. As illustrated in FIG. 3A and FIG. 3C, the first main effective electrode 381 includes two strip-shaped electrodes 281a which cross with each other and are connected with each other, and the first main dummy electrode 282 includes four dummy sub-electrodes 282a, the two strip-shaped electrodes 281a cross each other to define four regions, and the four dummy sub-electrodes 282a are located in the four regions respectively. For example, each dummy sub-electrode 282a is spaced apart from the first finger dummy electrode 252 located in the finger portion 242.

For example, as illustrated in FIG. 3C, each strip-shaped electrode 281b includes at least two signal channels 262 (an example of the second signal channel in this disclosure), and each signal channel is constituted by a plurality of metal wires that are connected in sequence, thereby reducing the resistance of the signal channel. One signal channel 262 is schematically illustrated in FIG. 3C. There is no overlap between the plurality of signal channels (that is, the plurality of signal channels have no shared metal wire).

For example, the extension direction of each strip-shaped electrode 281b is different from the first direction D1 or/and the second direction D2. For example, the two strip-shaped electrodes 281b are orthogonal to each other, and the extension directions of each of the two strip-shaped electrodes 281b has an included angle of 45 degree with the first direction D1. For example, the two strip-shaped electrodes 281b are respectively parallel to two sides of the main body portion 241.

For example, the strip-shaped electrode 281b connects two sides of the main body portion of the touch electrode along the signal transmission direction, and for example, as illustrated in FIG. 3A, the touch signal is transmitted along the first direction D1 in the first touch electrode 210, and each strip-shaped electrode 281b penetrates through and connects with the two sides of the main body portion 251 along the first direction D1 to form a signal channel.

The embodiments of the present disclosure does not limit the total number of strip-shaped electrodes included in the cross structure and does not limit the extension direction of each strip-shaped electrode, as long as the strip-shaped electrode can form the signal channel to connect two sides of the main body portion of the touch electrode along the signal transmission direction and can be electrically connected with the effective electrodes in the finger portions of the touch electrode. For example, in other examples, the first main effective electrode 381 includes one strip-shaped electrode extending along the first direction, and the first main dummy electrode 282 includes two dummy sub-electrodes separated from each other by the one strip-shaped electrode.

For example, for each touch unit 200, the effective area (i.e. the area of the effective electrode) accounts for 52%-64% of the total area of the touch unit, that is, the area of the dummy electrode (hollow area) accounts for 36%-48% of the total area of the touch unit. If the dummy electrode area ratio is too large, the resistance of the touch electrode is increased, while if the dummy electrode area ratio is too small, the touch performance of the touch structure under the Low Ground Mass state cannot be effectively improved.

Figure 4:
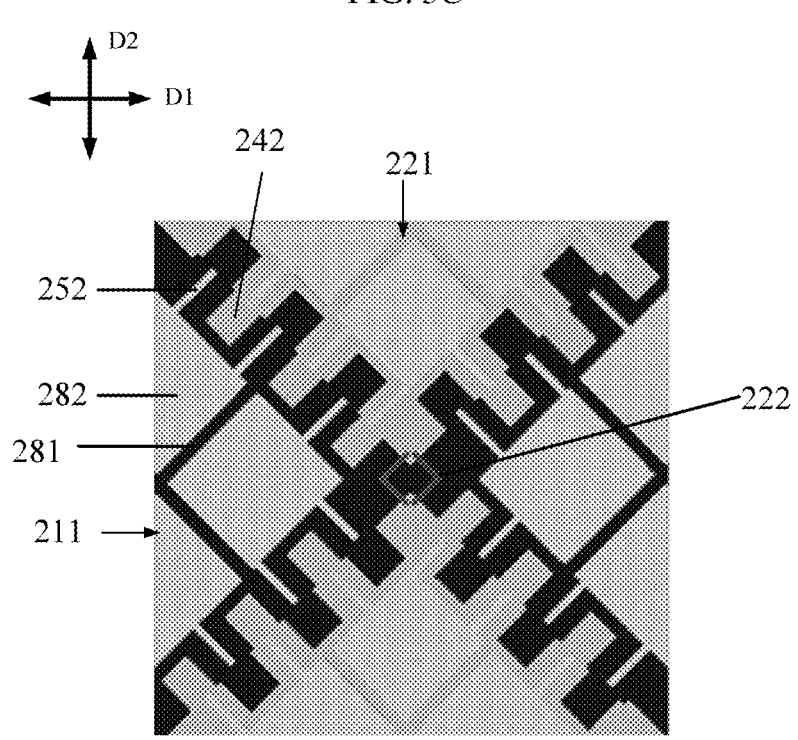
FIG. 4 is further another schematic diagram of the touch structure provided by at least one embodiment of the present disclosure.

FIG. 4 illustrates another schematic diagram of the touch structure provided by the embodiments of the present disclosure, and FIG. 4 illustrates a schematic diagram of one touch unit 200. Different from the embodiments illustrated in FIG. 3A, in the touch structure illustrated in FIG. 4, each dummy sub-electrode 282a in the first main dummy electrode 282 of the first touch electrode portion 211 is connected with at least one first finger dummy electrode 252 in the finger portion 242.

Figure 5A:
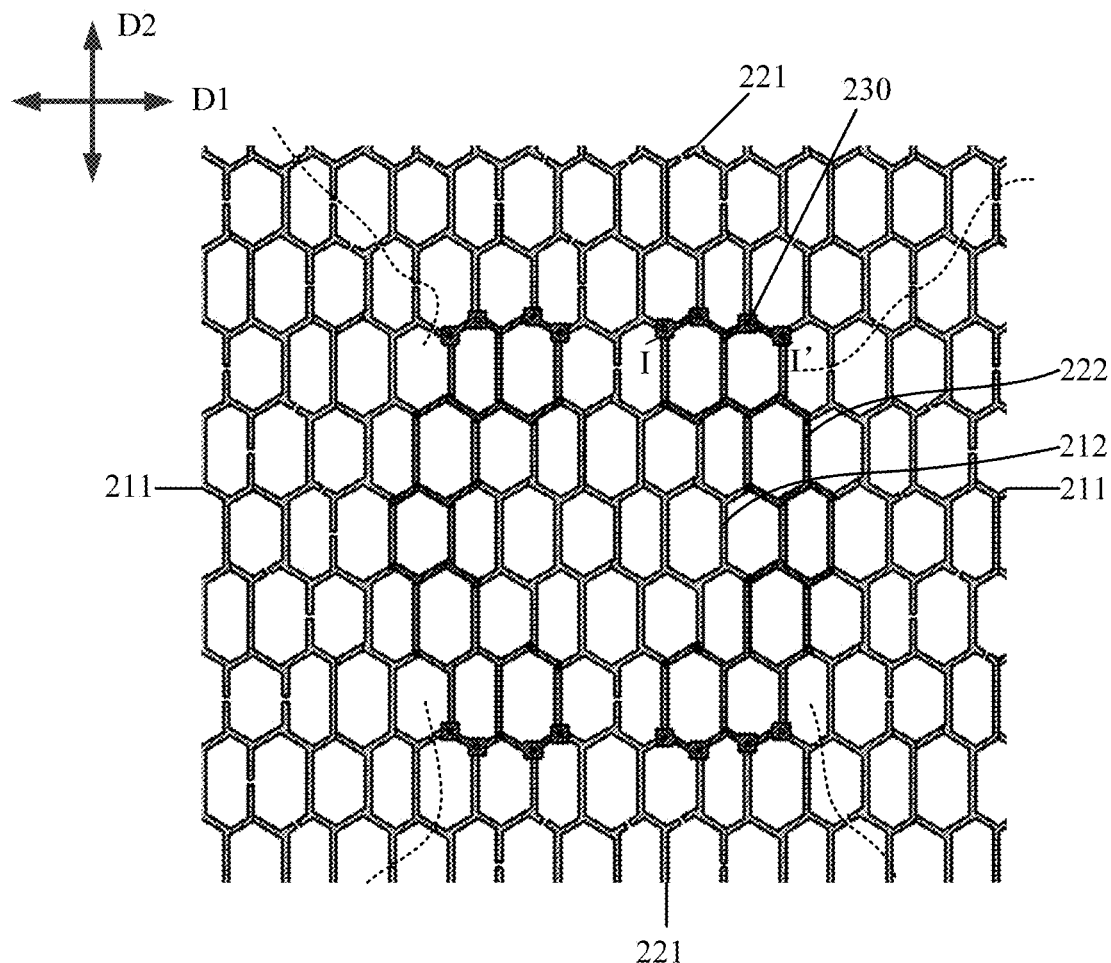
FIG. 5A is an enlarged schematic diagram of the area C in FIG. 3A.
Figure 5B:
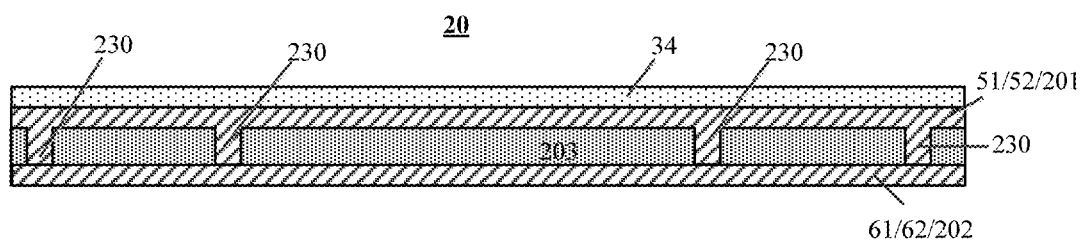
FIG. 5B is a sectional view taken along the section line I-I' of FIG. 5A.

FIG. 5A illustrates an enlarged schematic diagram of the area C of FIG. 3A, the area C is the intersection point of the first touch electrode 210 and the second touch electrode 220, that is, a bridge region. FIG. 5B is a sectional view taken along the section line I-I' of FIG. 5A. In FIG. 5A, the boundary between the first touch electrode portion 211 and the second touch electrode portion 221 adjacent to each other is illustrated by dashed lines.

Referring to FIGS. 5A-5B, the touch structure includes a first touch electrode layer 201, a second touch electrode layer 202, and an insulation layer 203 between the first touch electrode layer 201 and the second touch electrode layer 202. The first touch electrode layer includes a plurality of first metal meshes 52 defined by a plurality of first metal wires 51, and the second touch electrode layer includes a plurality of second metal meshes 62 defined by a plurality of second metal wires 61. The first touch electrode portion 211 and the first connection portion 212 of the first touch electrode 210 and the second touch electrode portion 221 of the second touch electrode 220 are all located in the first touch electrode layer 201 and respectively include the plurality of first metal meshes 52. The second connection portion 222 of the second touch electrode 220 is located in the second touch electrode layer 202, and is electrically connected with the second touch electrode portion 221 through a via hole 230 in the insulation layer 203, thereby electrically connecting two second touch electrode portions 221 adjacent to each other in the second direction D2.

For example, as illustrated in FIG. 5B, the touch structure 20 further includes a cover plate 34 above the touch structure, For example, the cover plate 34 is a glass cover plate or an organic flexible cover plate.

In other examples, a transparent protection layer (such as transparent optical glue) is used instead of the cover plate 34 to protect the touch structure 20.

Figure 6A:
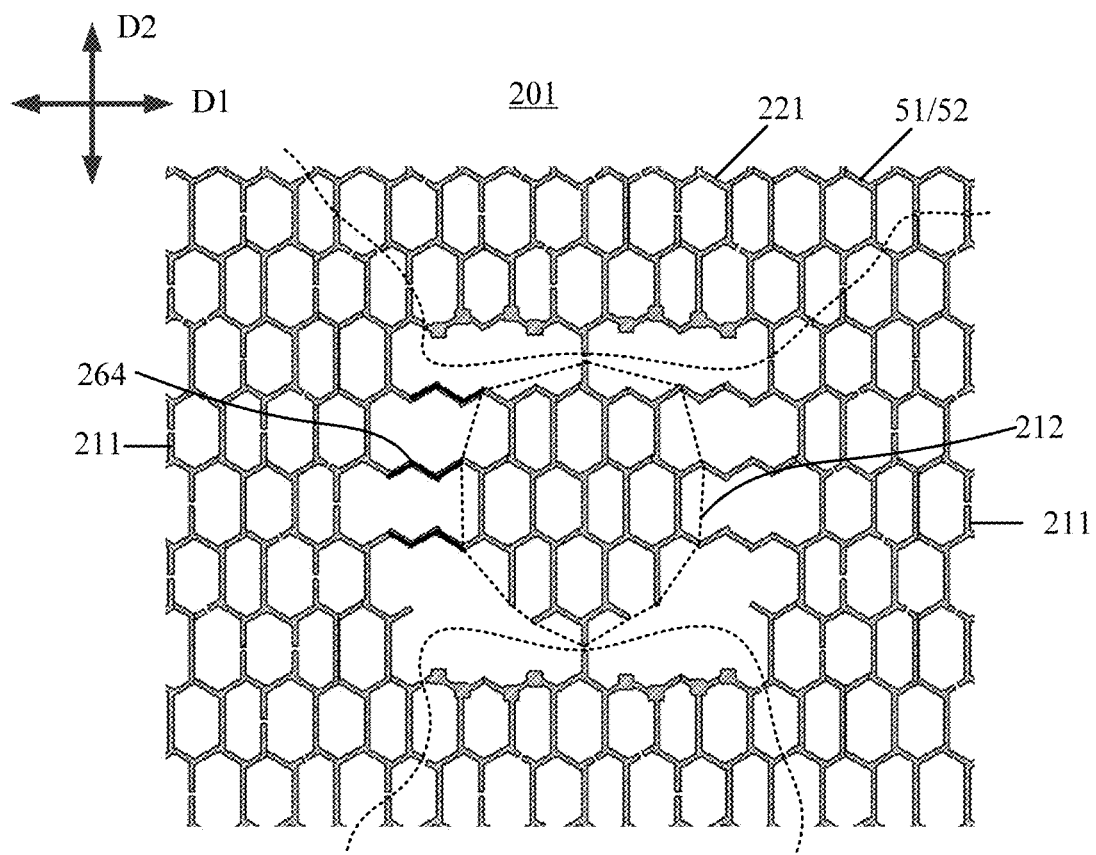
FIG. 6A and FIG. 6B respectively show a first touch electrode layer and a second touch electrode layer.
Figure 6B:
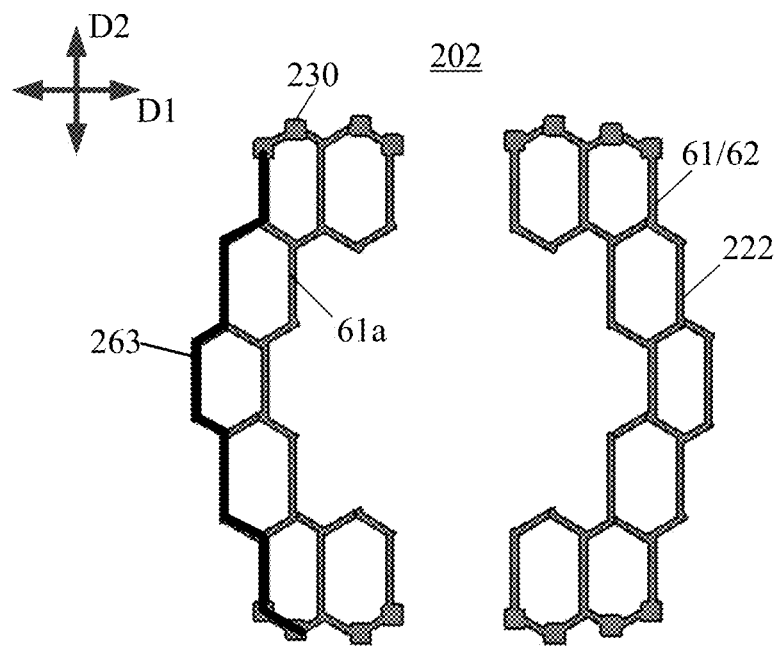

FIG. 6A and FIG. 6B illustrate the first touch electrode layer and the second touch electrode layer that respectively corresponds to those in FIG. 5A; in FIG. 6A, the boundary between the first touch electrode portion 211 and the second touch electrode portion 221 that are adjacent to each other is illustrated with dashed lines, and the first connection portion 212 is circled with dashed lines.

With reference to FIGS. 5A-5B and FIGS. 6A-6B, for example, the second touch electrode portions 221 adjacent to each other in the second direction D2 are electrically connected by two second connection portions 222. This dual-channel structure can effectively improve the yield of the device. For example, the position where the signal lines cross with each other is easy to cause short circuit defects because of electrostatic breakdown caused by a mutual capacitance. In the case that one channel of the two second connection portions 222 is detected to suffers short circuit defects in a detection process, even if the channel is cut off (for example, by laser cutting), the circuit structure still works normally through the other channel of the two second connection portions 222.

For example, an orthographic projection of the plurality of first metal wires 51 in at least two first metal meshes 52 in the second touch electrode portion 221 on the second metal mesh layer 60 overlaps with the plurality of second metal wires 61 in at least two second metal meshes 62 in each second connection portion 222, so that the at least two first metal meshes 52 have a plurality of vertices overlapping with the at least two second metal meshes 62, and the via holes 230 are correspondingly arranged at the overlapping vertices. The vertex at which the via hole 230 is provided is referred as a connection vertex.

It should be noted that the first metal wire in this disclosure refers to a metal wire connected between two adjacent vertices of the first metal mesh and the second metal wire in this disclosure refers to a metal wire connected between two adjacent vertices of the second metal mesh, that is, each first metal wire corresponds to one side of the first metal mesh and each second metal wire corresponds to one side of the second metal mesh.

For example, the first metal wire 51 directly connected to the connection vertex is complete without being broken, that is, the first metal wire 51 directly connected to the connection vertex is connected between two vertices of the first metal mesh 52 without having any fracture between the two vertices. For example, the first metal mesh 52 where the connection vertex is located is complete without being broken, that is, all the first metal wires 51 in the first metal mesh 52 where the connection vertex is located are complete without being broken. This arrangement can improve the transmission efficiency and effectiveness of the touch signal input from the second touch electrode portion 221 to the second connection portion 222.

For example, each second connection portion 222 includes at least two signal channels 263, and one signal channel 263 is schematically illustrated in FIG. 6B. The signal channel 263 is constituted by the plurality of second metal wires 61 that are connected end to end in sequence; each of two ends of the signal channel 263 corresponds to the vertex of the second metal mesh 62, and is electrically connected with the connection vertex of the first metal mesh 52 through the via hole 230, thereby effectively transmitting signals between two adjacent second touch electrode portions 221. For example, the plurality of signal channels 263 do not overlap with each other, that is, do not share the second metal wires 61 with each other.

For example, as illustrated in FIG. 6B, the second metal meshes 62 in the second connection portion 222 are all complete meshes without being broken, and the second metal wires 61 in the second metal meshes 62 have no fractures. This is because the total number of the metal meshes in the second connection portion 222 is small; the above design (i.e., the second metal meshes 62 in the second connection portion 222 are all complete meshes without being broken, and the second metal wires 61 in the second metal meshes 62 have no fractures) can improve the yield of the second connection portion 222 and ensure the effective transmission of signals.

For example, as illustrated in FIG. 6A, each first touch electrode portion 211 is electrically connected with the adjacent first connection portion 212 through at least one signal channel 264 constituted by a plurality of the first metal wires 51 that are connected end to end in sequence. FIG. 6A illustrates that each first touch electrode portion 211 is electrically connected with one adjacent first connection portion 222 through three signal channels 264, and each signal channel 264 includes three first metal wires 51. Referring to FIG. 5A and FIG. 6B, each first metal wire 51 in the signal channel 264 overlaps with the second metal wire 61 in the second connection portion 222 in a direction perpendicular to the first touch electrode layer 201, so that the pixel aperture ratio is not affected.

For example, as illustrated in FIG. 6A, the plurality of signal channels 264 are spaced apart from each other. There is no shared first metal wire 51 between the first metal mesh 52 in the first touch electrode portion 211 and the first metal mesh 52 in the first connection portion 212, that is, the first metal mesh 52 in the first touch electrode portion 211 and the first metal mesh 52 in the first connection portion 212 are not electrically connected with each other by a shared first metal wire 51 therebetween.

This arrangement can minimize the overlap of the metal wires in the first touch electrode portion 211 and the metal wires in the second connection portion 222, thereby reducing the mutual capacitance between the first touch electrode portion 211 and the second connection portion 222. When the mutual capacitance value between the first touch electrode 210 and the second touch electrode 220 changes because of the touch signal, it is easier to detect the change amount of the mutual capacitance value if the reference mutual capacitance value is small, thereby improving the sensitivity of touch detection.

For example, as illustrated in FIG. 6A, an edge first metal mesh 52 located at an edge of the first connection portion 212 is broken, for example, at least one edge of the edge first metal mesh 52 is not provided, so that the second metal wire 61 does not overlap with the first metal wire 51.

For example, referring to FIG. 6A and FIG. 6B in combination, each second connection portion 222 includes the second metal meshes 62 connected to each other, each second metal mesh 62 of each second connection portion 222 includes the second metal wires 61a parallel to the second direction D2, and each second metal wire 61a does not overlap with the first metal wires 51 in the direction perpendicular to the first touch electrode layer 201. For example, each second metal mesh 62 is hexagonal, and each second metal mesh 62 includes two second metal wires 61a parallel to the second direction D2.

For example, as illustrated in FIG. 6A, among the edge first metal wires of the first connection portion 212 except the first metal wires electrically connected with the signal channel 264, fractures (notches) are at their ends away from the first connection portion 212. As illustrated in FIG. 6A, for example, the first connection portion 212 includes an edge first metal wire with a middle fracture, and the middle fracture separates the first metal wire 51 into two first metal segments, the two first metal segments belong to the first connection portion 212 and the second touch electrode portion 221 adjacent to this first connection portion 212, thereby achieving insulation between the first connection portion 212 and the second touch electrode portion 221.

At least one embodiment of the present disclosure further provides a touch structure which includes a first touch electrode and a second touch electrode, the first touch electrode extends along a first direction, the second touch electrode extends along a second direction, and the first direction intersects with the second direction; the first touch electrode comprises a plurality of first touch electrode portions, each of the first touch electrode portions comprises a first main body portion and a plurality of first finger portions, and the plurality of first finger portions protrude from the first main body portion; the first main body portion comprises a first main effective electrode and a first main dummy electrode, the first main dummy electrode is provided inside the first main effective electrode and is insulated from the first main effective electrode; the first main dummy electrode comprises a dummy main body portion and a plurality of dummy finger portions, the dummy main body portion is a rectangle and the plurality of dummy finger portions protrude from four sides of the rectangle; the first main dummy electrode further comprises four complementary portions that are at positons respectively corresponding to four vertices of the dummy main body portion, so that an outer contour of the first main dummy electrode is a rectangle.

The structure of the first touch electrode in the touch structure of the at least one embodiment is applicable to the touch structure provided in any one of the previous embodiments.

Figure 7:
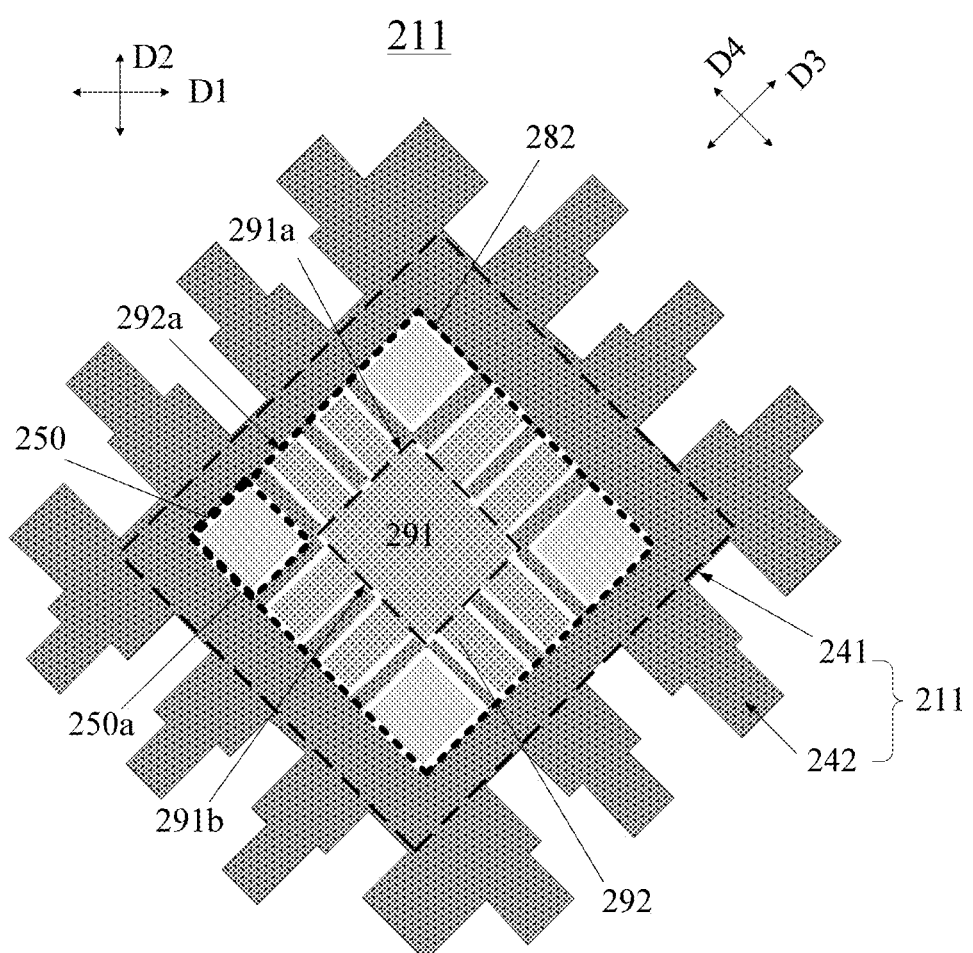
FIG. 7 is further another schematic diagram of the touch structure provided by at least one embodiment of the present disclosure.

FIG. 7 illustrates a schematic diagram of the first touch electrode portion in the touch structure. As illustrated in FIG. 7, the first touch electrode portion 211 includes a main body portion 241 and a plurality of finger portions 242, and the plurality of first finger portions 242 protrude from the main body portion 241. The main body portion 241 includes a first main effective electrode 281 and a first main dummy electrode 282, and the first main dummy electrode 282 is located inside the first main effective electrode 281 and insulated from the first main effective electrode 282. The first main dummy electrode 282 includes a dummy main body portion 291 and a plurality of dummy finger portions 292. An outer contour of the dummy main body portion 291 is in a shape of rectangle, and the plurality of dummy finger portions 292 protrude from four sides of the rectangle, are in a same layer as the first main effective electrode 281 and are interdigitated with and insulated from the first main effective electrode 281. The first main dummy electrode 282 further includes four complementary portions 250, the four complementary portions 250 are respectively arranged corresponding to four vertices of the dummy main body portion 291, so that the outer contour of the first main dummy electrode is a rectangle. In FIG. 7, the outer contours of the main body portion 241, the dummy main body portion 291 and the first main dummy electrode 282 of the first touch electrode portion are respectively illustrated by dashed lines.

For example, the dummy main body portion 291 is rectangular and includes a first side 291a and a second side 291b that cross each other, the first side 291a and the second side 291b respectively extend along a third direction D3 and a fourth direction D4, and the third direction D3 and the fourth direction D4 are different, for example, the third direction D3 and the fourth direction D4 are orthogonal. For example, the third direction D3 is different from the first direction D1 or the second direction D2; the fourth direction D4 is different from the first direction D1 or the second direction D2. For example, the third direction D3 has an included angle of 45 degrees with each of the first direction D1 and the second direction D2, and the fourth direction D4 has an included angle of 45 degrees with each of the first direction D1 and the second direction D2.

For example, a plurality of dummy finger portions 292 protrude from the first side 291a along the fourth direction D4, and each dummy finger portion 292 protruding from the first side 291a includes a side edge 292a parallel to the first side 291a; the plurality of dummy finger portions 292 protrude from the second edge 291b along the third direction D3, and each dummy finger portion 292 protruding from the second edge 291b includes a side edge 292a parallel to the second edge 291b. For example, the side edges 292a of the plurality of dummy finger portions 292 at a same side of the dummy main body portion 291 are aligned with each other and located in a same virtual straight line, and the virtual straight line is a part of the outer contour of the first main dummy electrode 282. For example, each dummy finger portion 292 is rectangular or trapezoidal.

For example, the plurality of dummy finger portions 292 protruding from a same side of the dummy main body portion 291 have a same maximum size in the protruding direction. For example, as illustrated in FIG. 7, the plurality of dummy finger portions 292 protruding from the first side 291a are arranged side by side along the third direction D3 and have a same maximum length along the fourth direction D4.

For example, the plurality of dummy finger portions 292 protruding from a same side of the dummy main body portion 291 have a same average size in the direction orthogonal to the protruding direction. For example, as illustrated in FIG. 7, average sizes, along the third direction D3, of the plurality of dummy finger portions 292 protruding from the first side 291a are the same.

For example, as illustrated in FIG. 7, the main body portion 241 of the first touch electrode portion is a rectangle, and the rectangle is arranged along the third direction D3 and the fourth direction D4. The finger portions 242 arranged on two opposite sides of the rectangle are staggered, that is, the finger portions 242 arranged on one side of the rectangle correspond to the gap between the finger portions 242 arranged on the other side opposite to the one side of the rectangle. For example, the finger portions 242 arranged on two sides of the rectangle opposite to each other in the third direction D3 are staggered in the fourth direction D4; the finger portions 242 arranged on two sides of the rectangle opposite to each other in the fourth direction D4 are staggered in the third direction D3.

For example, as illustrated in FIG. 7, the dummy finger portions 292 respectively provided on two opposite sides of the dummy main body portion 291 are in one-to-one correspondence with each other. For example, as illustrated in FIG. 7, two dummy finger portions 292 are provided on each side of the dummy main body portion 291, and the dummy finger portions 292, respectively on two sides opposite in the third direction or the fourth direction, are in one-to-one correspondence and overlap with each other in the third or the fourth direction.

For example, each complementary portion 250 is rectangular, and includes two side edges 250a respectively parallel to the first side 291a and the second side 291b, the two side edges 250a are respectively located on the outer contour of the first main dummy electrode 282.

For example, the complementary portion 250 and the dummy finger portion 292 adjacent to the complementary portion 250 are provided side by side and have a same maximum size along the protruding direction of the dummy finger portion 292.

For example, for each complementary portion 250, an average size of the complementary portion is larger than the size of the dummy finger portion 292 adjacent to the complementary portion 250 in the direction (e.g., the fourth direction D4 or the third direction D3 illustrated in FIG. 7) orthogonal to the protruding direction (e.g., the third direction D3 or the fourth direction D4 illustrated in FIG. 7) of the dummy finger portion 292 adjacent to the complementary portion 250.

For example, as illustrated in FIG. 7, each complementary portion 250 and the dummy main body portion 291 are spaced apart from each other or connected to each other.

The touch structure provided by at least one embodiment of the present disclosure is mainly described by taking the first touch electrode portion as an example, and the above description and arrangement of the first touch electrode portion are also applicable to the second touch electrode portion, which is not repeated here.

For example, a material of the first touch electrode layer 201 and a material of the second touch electrode layer 202 include a metal material such as aluminum, molybdenum, copper and silver or an alloy material of these metal materials, for example, is a silver palladium copper alloy (APC) material or a titanium-aluminum-titanium (Ti—Al—Ti) laminated structure.

For example, an average line width of the first metal wire 51 or the second metal wire 52 is 3 microns. For example, a width (the size along the length direction of the metal wire) of the fracture (notch) on the metal wire is 5.2 microns.

For example, a material of the insulation layer 203 is an inorganic insulation material, for example, the inorganic insulation material is a transparent material. For example, the inorganic insulation material includes silicon oxide, silicon nitride or silicon oxynitride, or includes aluminum oxide, titanium nitride, or includes other insulation materials including metal oxynitride.

For example, the material of the insulation layer 203 is an organic insulation material to obtain good bending properties. For example, the organic insulation material is a transparent material. For example, the organic insulating material is OCA optical adhesive. For example, the organic insulating material includes polyimide (PI), acrylate, epoxy resin, polymethylmethacrylate (PMMA), etc.

Figure 8:
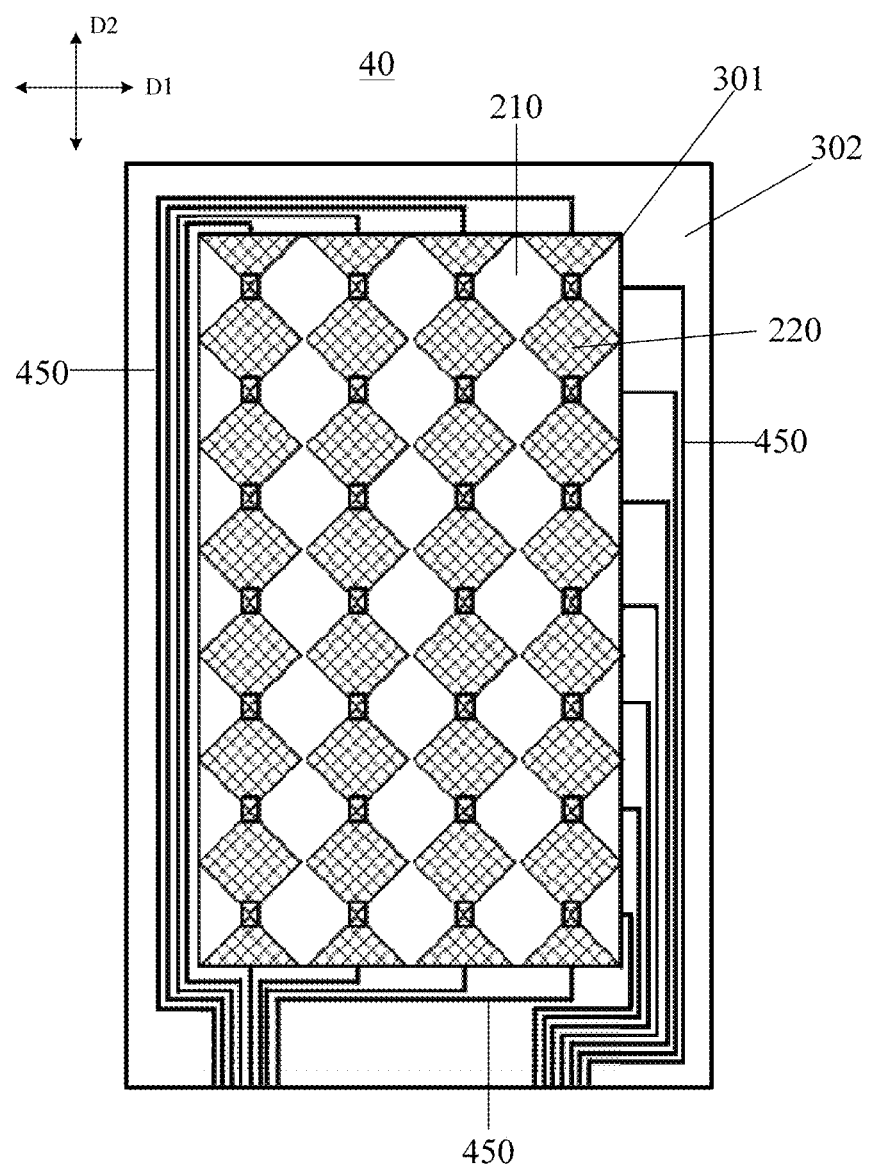
FIG. 8 is a schematic diagram of a touch panel provided by at least one embodiment of the present disclosure.

At least one embodiment of the disclosure further provides a touch panel which includes the above-mentioned touch structure. FIG. 8 is a schematic diagram of a touch panel provided by at least one embodiment of the present disclosure. As illustrated in FIG. 8, the touch panel 40 includes a touch region 301 and a non-touch region 302 located outside the touch region 301, and the touch structure 20 is located in the touch region 301. For example, the first touch electrode 210 extends along the width direction of the touch region 301, and the second touch electrode 220 extends along the length direction of the touch region 301. For the sake of clarity, the structures of the first touch electrode and the second touch electrode are not illustrated in detail.

For example, as illustrated in FIG. 8, the touch panel 40 further includes a plurality of signal lines 450 located in the non-touch region 302. Each first touch electrode 210 and each second touch electrode 220 are respectively electrically connected to one signal line 450, and are connected to a touch controller or a touch integrated circuit (not illustrated in the figure) through the signal line. For example, the first touch electrode 210 is a touch sense electrode, and the second touch electrode 220 is a touch drive electrode, but the embodiments of the present disclosure are not limited to this.

The touch integrated circuit is, for example, a touch chip, which is used for providing touch drive signals to the second touch electrode 220 in the touch panel 40, receiving touch sense signals from the first touch electrode 210, and processing the touch sense signals, for example, providing the processed data/signals to a system controller, so as to realize the touch sensing function.

For example, as illustrated in FIG. 8, ends, connected with the touch integrated circuit, of the plurality of signal lines 450 are arranged at a same side of the touch region 301 (for example, the lower side in FIG. 8), which can facilitate the connection of the plurality of signal lines 450 with the touch integrated circuit.

At least one embodiment of the present disclosure further provides a touch display panel which comprises a base substrate, a display structure, and the touch structure 20 provided by any one of the above embodiments, and the display structure and the touch structure 20 are stacked on the base substrate.

Figure 9A:
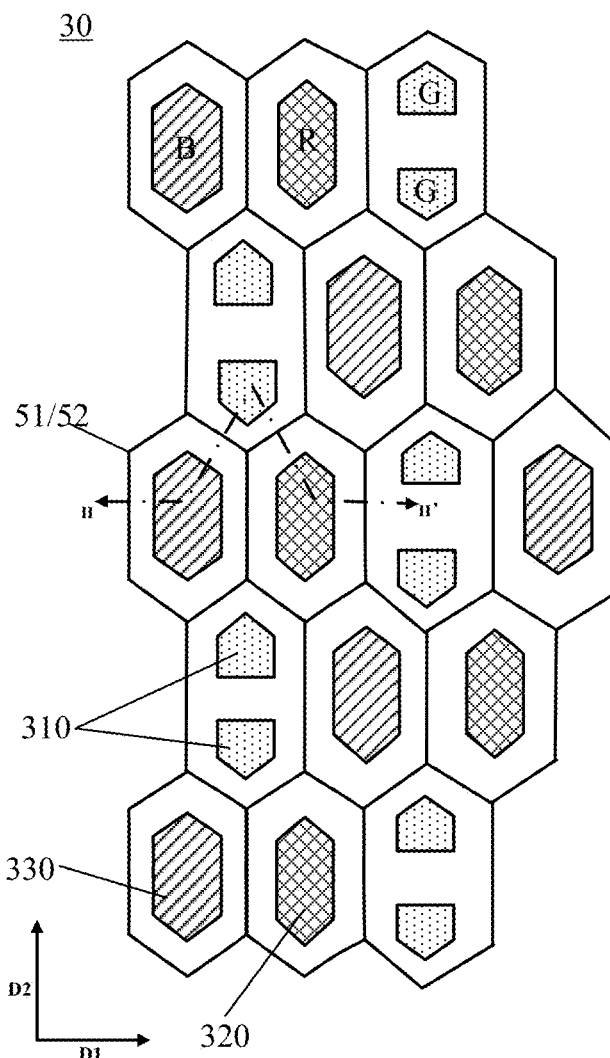
FIG. 9A is a schematic diagram of a touch display panel provided by at least one embodiment of the present disclosure.
Figure 9B:
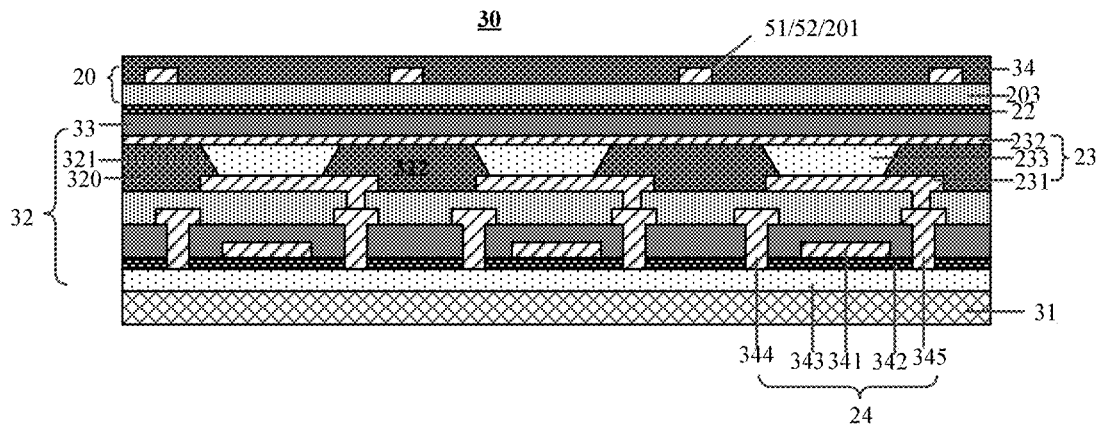
FIG. 9B is a sectional view taken along the section line II-II' of FIG. 9A.

FIG. 9A shows a schematic plan view of the touch display panel provided by at least one embodiment of the present disclosure, and FIG. 9B shows a cross-sectional view taken along the section line II-II' of FIG. 9A.

Referring to FIG. 9A and FIG. 9B, the touch display panel 30 includes a base substrate 31, and a display structure 32 and the touch structure 20 that are sequentially stacked on the base substrate 31. The touch structure 20 is located on a side of the display structure 32 away from the base substrate 31 and is closer to the user during use of the touch display panel 30.

For example, the display structure 32 includes a plurality of sub-pixels arranged in an array, for example, the array is arranged along the first direction D1 and the second direction D2. For example, the touch display panel is an OLED display panel, and the plurality of sub-pixels include a green sub-pixel (G), a red sub-pixel (R) and a blue sub-pixel (B). Each sub-pixel includes a light-emitting element 23 and a pixel drive circuit that drives the light-emitting element 23 to emit light. The embodiments of the present disclosure do not limit the type and specific composition of the pixel drive circuit. For example, the pixel drive circuit may be in a current-driving type or a voltage-driving type, may be a 2T1C (i.e., two transistors and a capacitor, and the two transistors include a drive transistor and a data writing transistor) drive circuit, and may further include a compensation circuit (a compensation transistor), a light emission control circuit (a light emission control transistor), a reset circuit (a reset transistor), etc. based on 2T1C.

For the sake of clarity, FIG. 9B only shows a first transistor 24 in the pixel drive circuit, and the first transistor 24 is directly electrically connected with the light-emitting element 23. The first transistor 24 for example is a drive transistor configured to work in a saturated state and control the intensity of a current for driving the light-emitting element 23 to emit light. For example, the first transistor 24 is a light emission control transistor configured to control whether the current for driving the light-emitting element 23 to emit light flows. Embodiments of the present disclosure do not limit the specific type of the first transistor.

For example, the light-emitting element 23 is an organic light emitting diode and includes a first electrode 231, a light-emitting layer 233 and a second electrode 232. One of the first electrode 231 and the second electrode 232 is an anode and the other is a cathode. For example, the first electrode 231 is the anode and the second electrode 232 is the cathode. For example, the light-emitting layer 233 is an organic light emitting layer or a quantum dot light-emitting layer. For example, the light-emitting element 23 includes auxiliary functional layers such as a hole injection layer, a hole transport layer, an electron injection layer, and an electron transport layer in addition to the light-emitting layer 233. For example, the light-emitting element 23 has a top emission structure, the first electrode 231 has reflectivity and the second electrode 232 has a transmittance property or a semi-transmittance property. For example, the first electrode 231 is made of a material with high work function to serve as the anode, for example, an ITO/Ag/ITO laminated structure; the second electrode 232 is a material with low work function to serve as the cathode, for example, a semi-transmissive metal or a metal alloy material, for example, an Ag/Mg alloy material.

The first transistor 24 includes a gate electrode 341, a gate insulation layer 342, an active layer 343, a first electrode 344, and a second electrode 345 electrically connected to the first electrode 231 of the light-emitting element 23. The embodiments of the present disclosure do not limit the type, material and structure of the first transistor 24, for example, the first transistor 24 may be of a top gate type, a bottom gate type, etc. The active layer 343 of the first transistor 24 may be amorphous silicon, polysilicon (low temperature polysilicon and high temperature polysilicon), oxide semiconductor (for example, indium gallium tin oxide (IGZO)), etc., and the first transistor 24 may be of n-type or p-type.

Transistors adopted in the embodiments of the present disclosure may be thin film transistors, field effect transistors or other switch devices with the same characteristics as the thin film transistors, and the thin film transistors are taken as examples in the embodiments of the present disclosure. The source electrode and the drain electrode of the transistor adopted here may be symmetrical in structure, so there is no difference in structure between the source electrode and the drain electrode. In the embodiments of the present disclosure, in order to distinguish the two electrodes of the transistor except the gate electrode, it is directly described that one electrode of the two is the first electrode and the other electrode is the second electrode.

As illustrated in FIG. 9A and FIG. 9B, the display structure 32 further includes a pixel definition layer 320 disposed on the first electrode 231 of the light-emitting element 23, a plurality of openings 321 are formed in the pixel defining layer to respectively expose the first electrodes 231 of the plurality of sub-pixels, thereby defining a pixel opening region of each sub-pixel, the light-emitting layer of the sub-pixel is formed in the pixel opening region, and the second electrode 232 is formed as a common electrode (that is, shared by the plurality of sub-pixels). In FIG. 9A, a pixel opening region 310 of the green sub-pixel, a pixel opening region 320 of the red sub-pixel, and a pixel opening region 330 of the blue sub-pixel are schematically illustrated.

Patterns in the second touch electrode layer 202 are not illustrated in FIG. 9B. For example, the second touch electrode layer 202 is located on a side of the first touch electrode layer 201 close to the substrate 31.

Orthographic projections of the first metal wires 51 in the first touch electrode layer 201 on the base substrate 31 and orthographic projections of the second metal wires 61 in the second touch electrode layer 202 on the base substrate 31 are located outside orthographic projection of the pixel opening regions of the sub-pixels on the base substrate 31, but are within orthographic projections of pixel separation regions on the base substrate 31, and the pixel separation region is between the pixel opening regions and is a non-opening region 322 of the pixel definition layer 320. The pixel separation region is configured to separate the pixel openings of the plurality of sub-pixels from each other and separate the light-emitting layers of the sub-pixels from each other to prevent color mixing of the sub-pixels.

For example, the opening of the first metal meshes 52 or the opening of the second metal meshes 62 covers at least one pixel opening region. For example, the opening of the first metal mesh 52 or the opening of the second metal mesh 62 cover the pixel opening regions 310 of two green sub-pixels, the two green sub-pixels are arranged in pairs and arranged immediately adjacent to each other in the second direction D2.

As illustrated in FIG. 9B, the display structure 32 further includes a first encapsulation layer 33 between the light-emitting element 23 and the touch structure 20, and the first encapsulation layer 33 is configured to seal the light-emitting element 23 to prevent external moisture and oxygen from penetrating into the light-emitting element and the driving circuit, thereby avoiding damage caused by the external moisture and oxygen to the devices such as the light-emitting element 23. For example, the first encapsulation layer 33 is a single-layer structure or a multi-layer structure including an organic thin film, an inorganic thin film, or a multi-layer structure in which organic thin films and inorganic thin films are alternately stacked, for example.

For example, as illustrated in FIG. 9B, the touch display panel 30 further includes a buffer layer 22 between the display structure 32 and the touch structure 20. For example, the buffer layer 22 is formed on the first encapsulation layer 33 to improve the adhesion between the touch structure 20 and the display structure 32. For example, the buffer layer 22 is an inorganic insulation layer, and a material of the buffer layer 22 may include silicon nitride, silicon oxide or silicon oxynitride. For example, the buffer layer 22 may include a structure in which a silicon oxide layer and a silicon nitride layer are alternately stacked.

At least one embodiment of the present disclosure further provides an electronic apparatus including the above-mentioned touch display panel 30.

For example, the electronic apparatus may be any product or component with display function and touch function, such as display, OLED panel, OLED TV, electronic paper, mobile phone, tablet computer, notebook computer, digital photo frame, navigator, etc.

What have been described above are only specific implementations of the present disclosure, the protection scope of the present disclosure is not limited thereto. The protection scope of the present disclosure should be based on the protection scope of the claims.

What is claimed is:

1. A touch structure comprising a first touch electrode and a second touch electrode,
   wherein the first touch electrode extends along a first direction, the second touch electrode extends along a second direction, and the first direction intersects with the second direction;
   the first touch electrode comprises a plurality of first touch electrode portions connected in series, each of the first touch electrode portions comprises a first main body portion and a plurality of first finger portions, and the plurality of first finger portions protrude from the first main body portion;
   at least one of the plurality of first touch electrode portions comprises a dummy electrode, and at least a part of the dummy electrode is in at least one first finger portion of the at least one of the plurality of first touch electrode portions;
   the at least one first finger portion of the at least one of the plurality of first touch electrode portions comprises a first finger effective electrode, the dummy electrode is insulated from the first finger effective electrode, and the first finger effective electrode is connected with the first main body portion of the at least one first touch electrode portion;
   the at least a part of the dummy electrode in the at least one first finger portion is a first finger dummy electrode, and the first finger dummy electrode is inside the first finger effective electrode;
   the dummy electrode further comprises a first main dummy electrode in the first main body portion of the at least one of the plurality first touch electrode portions, the first main body portion of the at least one of the plurality first touch electrode portions comprises a first main effective electrode, and the first main dummy electrode is insulated from the first main effective electrode; in the at least one of the plurality first touch electrode portions, the first main effective electrode is electrically connected with the first finger effective electrode;
   the first main dummy electrode comprises a dummy main body portion and a plurality of dummy finger portions, the plurality of dummy finger portions protrude from the dummy main body portion, the plurality of dummy finger portions are in a same layer as the first main effective electrode, and are interdigitated with and insulated from the first main effective electrode;
   the dummy main body portion is in a shape of rectangle, and the plurality of dummy finger portions protrude from four sides of the rectangle;
   the first main dummy electrode further comprises four complementary portions,
   the four complementary portions are at positions respectively corresponding to four vertices of the dummy main body portion, so that an outer contour of the first main dummy electrode is rectangular.

2. The touch structure according to claim 1, wherein the second main body portion of at least one of the plurality of second touch electrode portions comprises a second main effective electrode and a second main dummy electrode,
   the second main dummy electrode is inside the second main effective electrode and is insulated from the second main effective electrode.

3. The touch structure according to claim 2, wherein the first touch electrode and the second touch electrode constitute a touch unit at an intersection of the first touch electrode and the second touch electrode, the touch unit comprises halves, facing to each other, of two first touch electrode portions that are connected at the intersection, halves, facing to each other, of two second touch electrode portions that are connected at the intersection, a first connection portion connecting the two first touch electrode portions and a second connection portion connecting the two second touch electrode portions, and
   an effective area of the touch unit accounts for 36%-48% of a total area of the touch unit.

4. The touch structure according to claim 1,
wherein each of the plurality of first touch electrode portions comprises a plurality of metal meshes constituted by a plurality of metal wires that are connected with each other; and
a portion of the first finger effective electrode on any side of the first finger dummy electrode comprises at least two first signal channels,
each of the at least two first signal channels is constituted by a plurality of metal wires that are connected in sequence.

5. The touch structure according to claim 4, wherein
an outer contour of the first finger dummy electrode is an irregular polygon,
a portion of the first finger effective electrode, between each edge of the first finger dummy electrode and an edge of the first finger portion where the first finger dummy electrode is located, comprises at least two first signal channels.

6. The touch structure according to claim 1, wherein the second touch electrode comprises a plurality of second touch electrode portions connected in series, each of the plurality of second touch electrode portions comprises a second main body portion and a plurality of second finger portions, and the plurality of second finger portions protrude from the second main body portion.

7. The touch structure according to claim 6, wherein at least one second finger portion of at least one of the plurality of second touch electrode portions comprises a second finger effective electrode and a second finger dummy electrode, the second finger dummy electrode is insulated from the second effective electrode, and the second finger effective electrode is connected with the second main body portion.

8. The touch structure according to claim 6, wherein the first finger portions are in a same layer as the second finger portions, and insulated from and interdigitated with the second finger portions.

9. The touch structure according to claim 1, wherein the first main effective electrode comprises at least one strip-shaped electrode, and the first main dummy electrode comprises a plurality of dummy sub-electrodes, and the at least one strip-shaped electrode separates the plurality of dummy sub-electrodes from each other.

10. The touch structure according to claim 9, wherein each of the at least one strip-shaped electrode comprises at least two second signal channels, and each of the at least two second signal channels is constituted by a plurality of metal wires that are connected in sequence.

11. The touch structure according to claim 9, wherein one of the plurality of dummy sub-electrodes is connected with the first finger dummy electrode.

12. A touch structure comprising a first touch electrode and a second touch electrode,
wherein the first touch electrode extends along a first direction, the second touch electrode extends along a second direction, and the first direction intersects with the second direction;
the first touch electrode comprises a plurality of first touch electrode portions, each of the first touch electrode portions comprises a first main body portion and a plurality of first finger portions, and the plurality of first finger portions protrude from the first main body portion;
the first main body portion comprises a first main effective electrode and a first main dummy electrode which are insulated from each other;
the first main dummy electrode of at least one of the plurality of first touch electrode portions comprises a dummy main body portion and a plurality of dummy finger portions, the dummy main body portion is a rectangle and the plurality of dummy finger portions protrude from four sides of the rectangle;
the first main dummy electrode further comprises four complementary portions that are at positions respectively corresponding to four vertices of the dummy main body portion, so that an outer contour of the first main dummy electrode is in a shape of rectangle.

13. The touch structure according to claim 12, wherein
each of the complementary portions and the dummy finger portion adjacent to the each of the complementary portions are provided side by side along a third direction, and maximum sizes of the complementary portions along a fourth direction are same, and the third direction is different from the fourth direction; and
each of the four complementary portions is spaced apart from or connected with the dummy main body portion.

14. A touch display panel, comprising:
a base substrate,
a display structure, and
the touch structure according to claim 12,
wherein the display structure and the touch structure are sequentially stacked on the base substrate.

* * * * *